United States Patent [19]
Ludwig

[11] Patent Number: 5,564,332
[45] Date of Patent: Oct. 15, 1996

[54] MEAT MASSAGING MACHINE

[75] Inventor: Ralf Ludwig, Highland, N.Y.

[73] Assignee: WTI, Inc., Highland, N.Y.

[21] Appl. No.: 567,565

[22] Filed: Dec. 5, 1995

[51] Int. Cl.⁶ .............................. A23L 1/00; A23L 1/31; A23L 3/34; A22C 9/00
[52] U.S. Cl. ................ 99/472; 99/348; 99/487; 99/517; 99/535; 366/139; 366/144
[58] Field of Search ............................ 99/472, 516, 517, 99/532–535, 348, 487; 366/110, 139, 144, 219, 185, 233, 235, 147; 426/231, 519, 641, 524, 266, 281; 452/141

[56] References Cited

U.S. PATENT DOCUMENTS

| | | |
|---|---|---|
| 4,038,426 | 7/1977 | Jespersen et al. .............. 99/535 X |
| 4,214,518 | 7/1980 | Petsche ......................... 99/535 X |
| 4,409,704 | 10/1983 | Seiffhart ......................... 452/141 |
| 4,432,650 | 2/1984 | Langen et al. ..................... 366/147 |
| 4,446,779 | 5/1984 | Hubbard et al. ..................... 99/472 |
| 4,498,378 | 2/1985 | Norrie et al. ...................... 99/348 X |
| 4,517,888 | 5/1985 | Gould ................................ 99/472 |
| 4,520,718 | 6/1985 | Prosenbauer ....................... 99/535 |
| 4,522,118 | 6/1985 | Simonsen et al. .................. 99/472 |
| 4,791,705 | 12/1988 | Corominas ........................ 452/141 |
| 4,958,410 | 9/1990 | Lagares ......................... 99/472 X |
| 5,104,232 | 4/1992 | Lennox, III .................. 366/139 X |
| 5,323,694 | 6/1994 | Higashimoto .................. 99/487 X |
| 5,405,630 | 4/1995 | Ludwig . | |

*Primary Examiner*—Timothy F. Simone
*Attorney, Agent, or Firm*—Herbert Dubno

[57] ABSTRACT

A massaging machine has a tank inclined to the horizontal and pressure-tight chute at the upper end for loading pieces of meat into the vessel and a chute at the lower end for discharging the massaged meat. The tank is supported by load cells on respective legs of a support and the paddles are designed, upon rotation, to urge the pieces of meat away from the discharge chute until the direction of the paddle shaft is reversed to allow discharge of the meat.

15 Claims, 6 Drawing Sheets

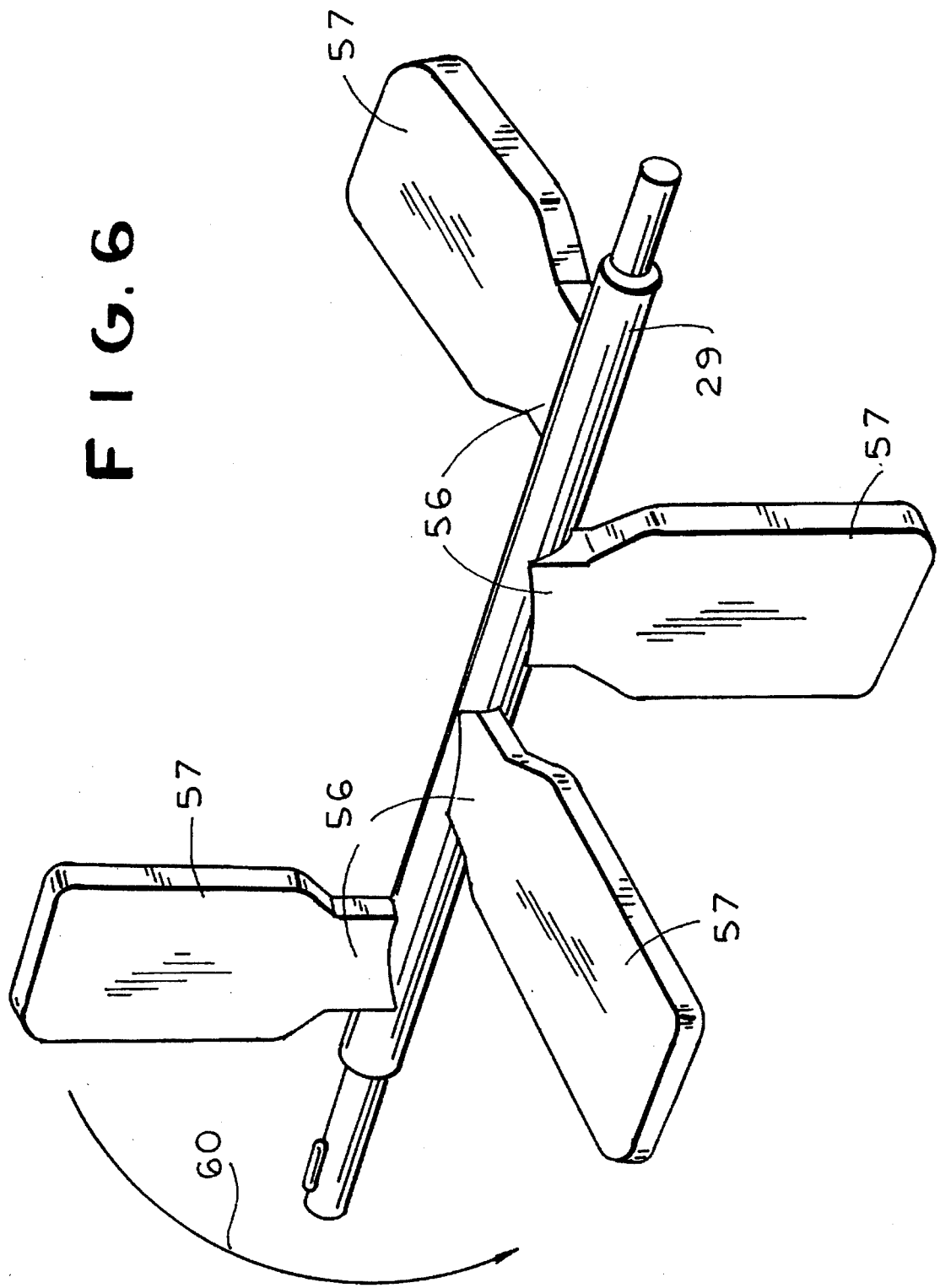

MEAT MASSAGING MACHINE

FIELD OF THE INVENTION

The present invention relates to a meat massaging machine and, more particularly, to a machine for massaging a solution, typically a brine or other aqueous solution, into pieces of meat such as poultry, carcasses, hams, beef roasts and the like.

BACKGROUND OF THE INVENTION

In recent years it has become common practice to inject pieces of meat with flavor enhancing solutions and solutions which improve the cooking qualities of meat, which may contain preservatives and which may serve to automatically baste meat upon roasting.

Aqueous solutions of this type can include phosphates, salt and like flavor enhancers, proteins, binders, fats or other meat-treating agents.

In order to insure effective distribution of the solution throughout the piece of meat, the piece of meat can be massaged after or concurrently with application of the solution. For this purpose the piece of meat is agitated in the treating solution generally for a period of time sufficient to enable the liquid to be homogeneously distributed in the piece of meat.

In the past, the machines used for this purpose have generally been tumblers, i.e. can have a drum into which the meat is inserted at an end and which rotate to tumble the pieces of meat in the solution. Control of the operation can be effected by time or by periodically stopping the machine and inspecting the product.

In the commonly owned U.S. Pat. No. 5,405,630, there is described a process in which the change in viscosity of the meat serves as a basis for controlling the massaging operation in a machine utilizing paddles to agitate the meat in contact with the liquid.

While the latter approach has represented a major advance in controlling the massaging of meat in contact with a solution, the machine itself has nevertheless been found to be capable of improvement.

OBJECTS OF THE INVENTION

It is, therefore, the principal object of the present invention to provide an improved machine for massaging pieces of meat in a solution so as to impregnate the meat with the solution and distribute the solution uniformly in the piece of meat, whereby drawbacks of earlier machines are obviated.

Another object of the invention is to advance the principles of U.S. Pat. No. 5,405,630 and provide a machine which benefits from the advantage of that patented machine but in addition is more efficiently operated and more effective in the treatment of meat.

SUMMARY OF THE INVENTION

These objects and others which will become apparent hereinafter are attained in accordance with the invention in a machine for massaging a solution into pieces of meat which comprises:

- a vacuumizable housing (i.e. a housing which can be subjected to a subatmospheric pressure or suction) having a generally cylindrical body with an axis inclined to a horizontal and axially opposite ends;
- a massaging blade shaft extending along the axis and journaled in respective bearings at the ends;
- respective arms axially and angularly spaced about the shaft, secured to the shaft and extending radially therefrom;
- a cylindrical receptacle in the housing coaxial with the body and receiving a treatment solution and pieces of meat to be massaged with the solution, the arms being located and oriented so as to retard movement of pieces of meat from an upper end of the receptacle toward a lower end of the receptacle while massaging the solution into the pieces of meat;
- an inlet chute at an upper one of the ends of the housing provided with a pressure-sealing hatch and an outlet chute provided with a pressure-sealing hatch at a lower one of the ends of the housing for respectively introducing the pieces of meat to be massaged into the housing and the receptacle and for discharging massaged pieces of meat from the receptacle and the housing;
- means forming a refrigerant compartment around the receptacle for chilling the solution and the pieces of meat;
- a layer of insulation interposed between the compartment and the housing; and
- a refrigerating unit for compressing and dissipating compression heat from a refrigerant connected to the compartment in a refrigerant recirculating path.

According to the invention, the arms are formed with paddles lying in respective radial planes inclined to the axis. The paddles and the inner surfaces of the receptacle are electropolished. Having electropolished surfaces of the machine as the surface contacting the pieces of meat while the paddles are rotating within the receptacle has been found to be important for a uniform massage action and consequently an effective and rapid penetration of the solution uniformly into the piece of meat.

Another important feature of the invention is that the arms are arranged along the shaft in a screw pattern tending to displace the pieces of meat away from the discharge chute or end during the normal rotation of the shaft in the massaging action.

The drive means for the shaft, which are designed to control the massaging action in response to a frequency controller and microprocessor utilizing the principles of U.S. Pat. No. 5,405,630, can also be reversible so that, when the pieces of meat are to be discharged, the drive can be reversed and the "screw" formed by the array of arms and inclined paddles, tends to displace the pieces of meat toward the outlet chute.

One of the major problems encountered with massaging machines heretofore is the cleaning thereof. In the past, cleaning of the machines, especially at the doors opening into the drum has involved significant disassembly work, leaving numerous parts which often are lost and creating a time consuming reassembly problem if lost parts must be replaced or found. Accordingly, with the system of the invention, all of the parts of the machine which must be disassembled for cleaning are nevertheless linked to the housing. Thus, the hatches may be hingedly connected to the housing to limit the separation of the hatches from the chutes for the cleaning operation.

According to another feature of the invention, the housing is provided with four posts at the corners of a rectangle while a support for the housing or base of the machine is provided with four legs, each post being aligned with a respective leg.

Between the posts and the legs, respective load cells are provided, the load cells signalling the quantity of meat and solution within the cylindrical body or tank.

As a result of these features, paddle type massage of the pieces of meat can be carried out more effectively than with prior art systems, thereby improving the quality of the product and reducing the time expended upon the treatment.

BRIEF DESCRIPTION OF THE DRAWING

The above and other objects, features, and advantages will become more readily apparent from the following description, reference being made to the accompanying drawing in which:

FIG. 6 is a perspective view of another paddle shaft.

SPECIFIC DESCRIPTION

Figure 1:
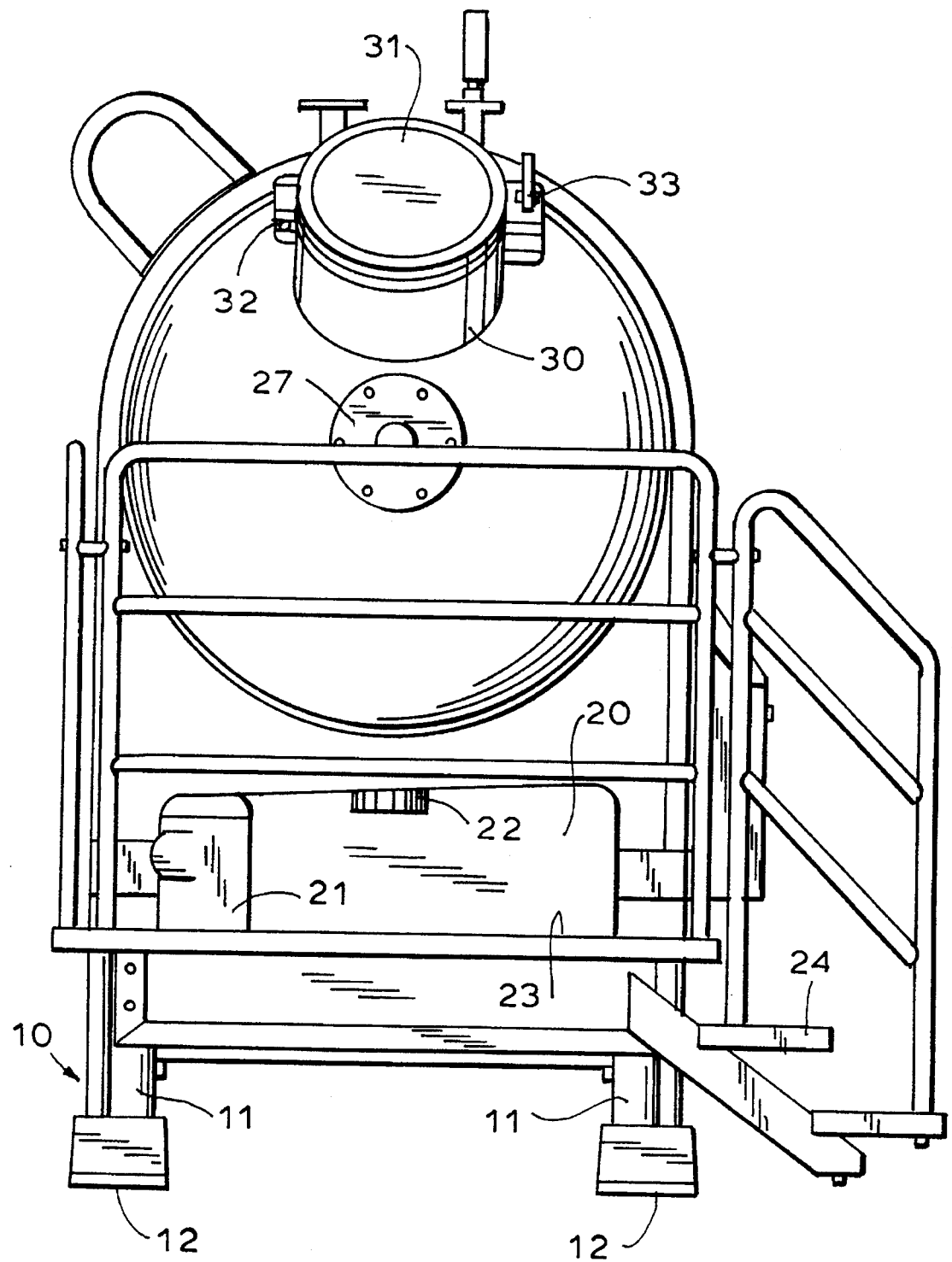
FIG. 1 is a front elevational view of a massaging machine according to the invention.
Figure 2:
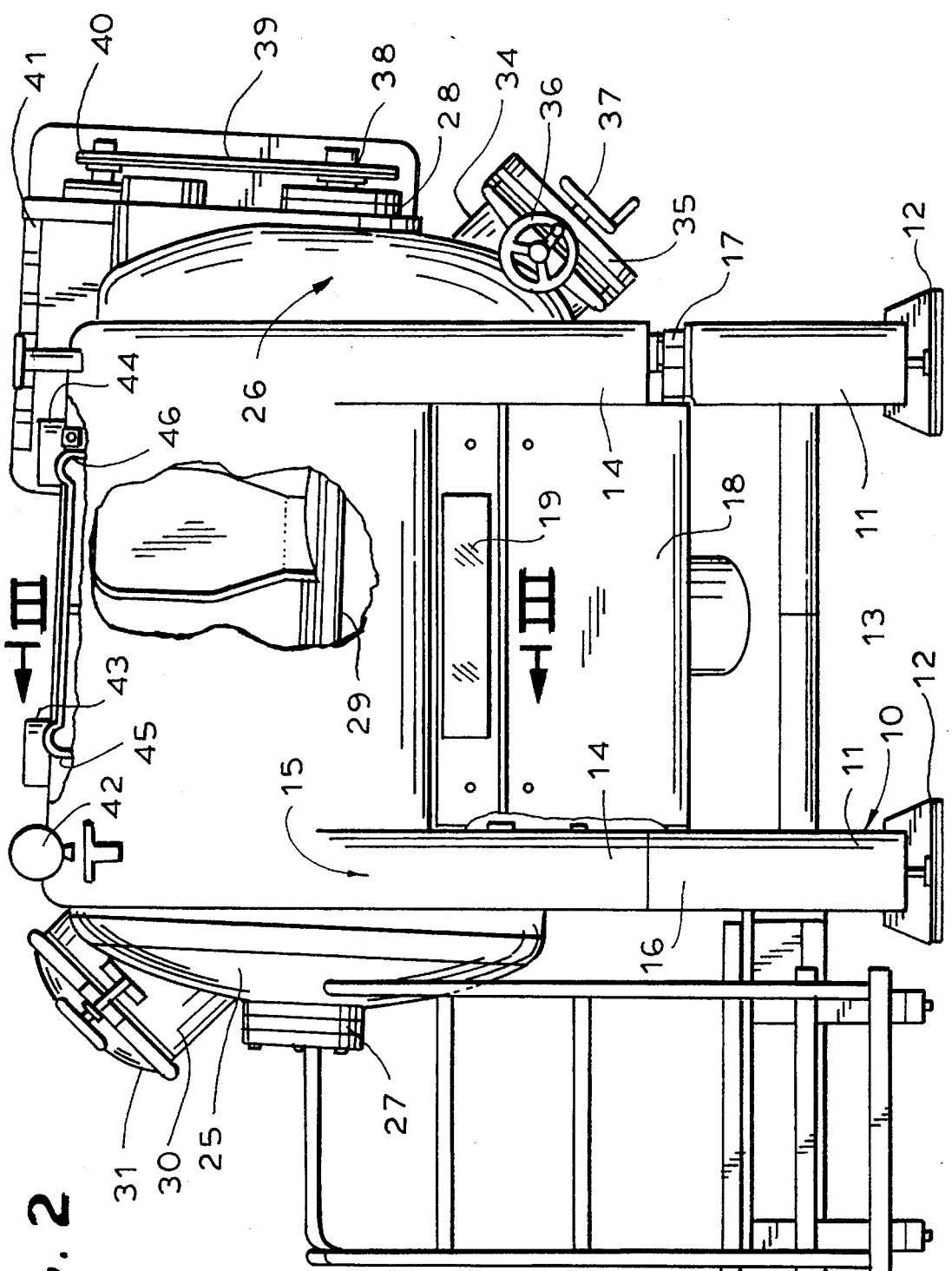
FIG. 2 is a side elevational view of the machine of the invention, partly broken away to show one of the paddles and shaft arms in the interior.

Turning to FIGS. 1 and 2, it can be seen that the machine or apparatus of FIGS. 1 and 2 comprises a base 10 comprised of four legs 11 located at the corners of a rectangle and provided with support feet 12 or pads which can be anchored to a floor or other base. Cross bars 13 connect the legs and each leg 11 is aligned with a post 14 of a housing 15 formed with a tank or cylindrical body 16. Between each post 14 and the respective leg 11 is a respective load cell 17, the load cells being connected to a display unit within the electrical equipment housing 18. A window 19 of this housing displays the load of the tank, i.e. the quantity of meat and treating solution introduced into the latter. The solution can be introduced in the tank from a solution container 20 via a pump 21. A cap 22 allows replenishment of the solution container.

To facilitate loading of pieces of meat, a platform 23 can be provided, accessible by steps 24.

At opposite ends 25 and 26 of the tank 16, bearings 27 and 28 are provided in which a paddle shaft 29 is journaled along the axis of the tank. Since the tank and the shaft are inclined to the horizontal, the end 25 can be considered an upper end and the end 26 a lower end.

The upper end 25 is formed with an inlet chute 30 closed by a pressure tight hatch 31 which can be connected to the chute 30 by a hinge 32 allowing the hatch to limit attached to the chute when the hatch is opened. The hatch can be sealed by a latch 33.

At the opposite or lower end 26, a discharge chute 34 can be provided which can be closed by a lower hatch 35, likewise connected by a hinge arrangement to the chute 34 and controlled by handwheels 36 and 37 to allow manual discharge of the pieces of massaged meat from the tank.

To drive the shaft 29, the latter is provided with a shaft 38 connected by chain 39 to a drive sprocket 40 of a motor 41. The motor 41 can be operated by a frequency controller via the system described in the aforementioned patent.

The tank 16 is maintained under vacuum by means not shown and has a vacuum gauge 42. Caps 43 and 44 seal the upper openings of the tank. Nozzles 45 and 46 discharge the phosphate solution from the tank 20 into the treatment vessel. The solution is thus sprayed over the pieces of meat in the vessel so that the action of the paddles can then massage the solution into the meat as the paddles are rotated by the motor 41.

Figure 3:
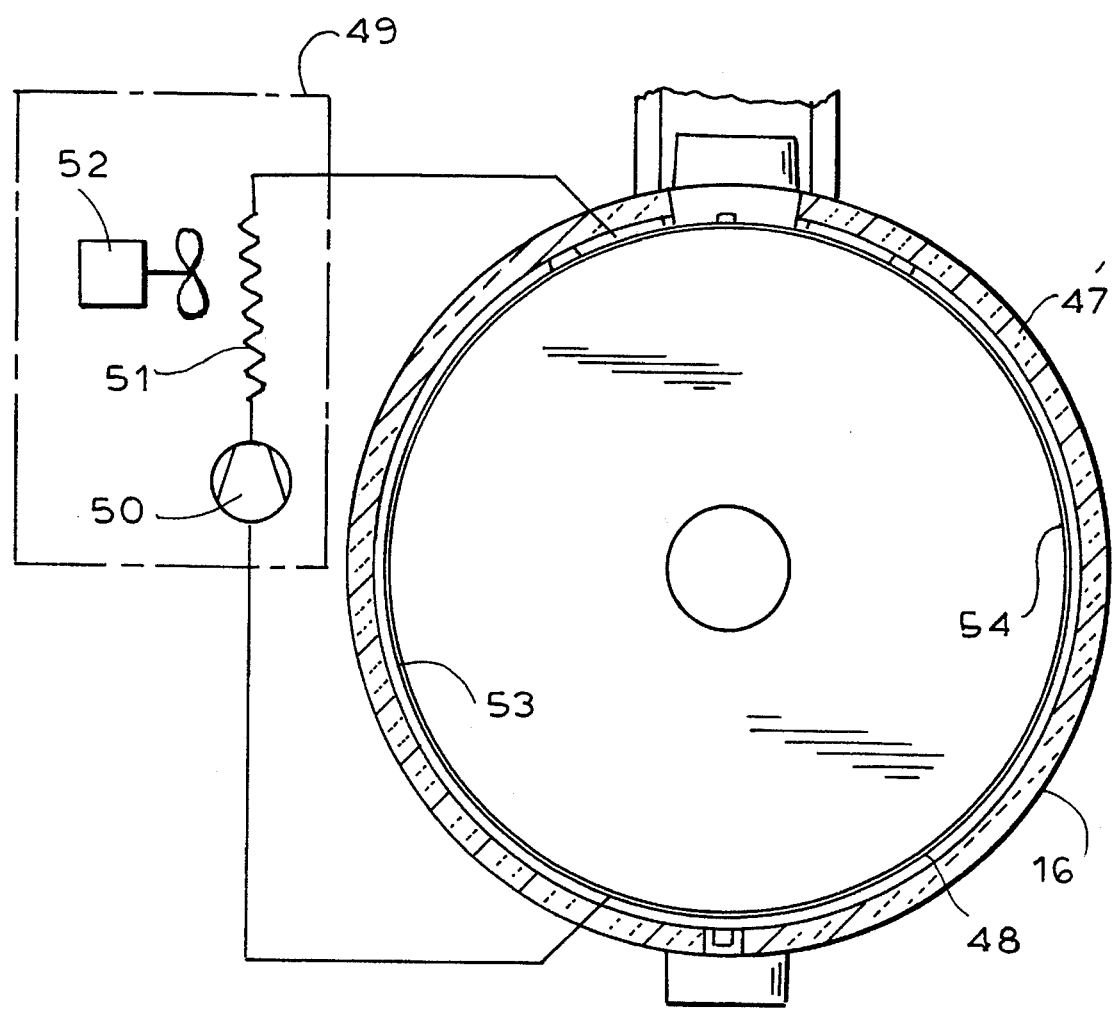
FIG. 3 is a cross sectional view taken along the line III—III of FIG. 2 showing only the tank and receptacle portions of the machine.

Turning to FIG. 3, it can be seen that the tank 16 has along its inner wall a layer 47 of thermal insulation surrounding a compartment 48 which is filled with a primary refrigerant such as ammonia, in a refrigerating system. The refrigerating system is represented symbolically at 49 and can comprise a compressor 50 for the refrigerant and a heat exchanger 51 with a fan 52 for dissipating the compression heat.

The refrigerating system circulates the primary refrigerant around the stationery receptacle 53 in which the massaging action takes place.

According to an important feature of the invention, the internal surface 54 of the receptacle 53 is electropolished. As can be seen from FIGS. 4 and 5, the shaft 29 is provided with a stub 55 on which the pulley 38 is mounted and with arms 56 formed with paddles 57. Four such paddles are provided on the shaft 29 and it is important that these paddles all be angularly spaced from one another even in projection (see FIG. 5) so that a screw pattern of such paddles is provided. When the shaft is then rotated in one sense, i.e. for massaging (arrow 60), the screw action tends to move the pieces of meat around and against the wall of the receptacle 53 to perform the massaging action while urging the pieces of meat away from the discharge chute or end and toward the load end. When, however, the shaft is rotated in the opposite sense by the reversible drive, the pieces of meat are advanced toward the discharge chute. The surfaces of the shaft 29, the arms 56 and the paddles 57 exposed to the meat are all electropolished.

Figure 4:
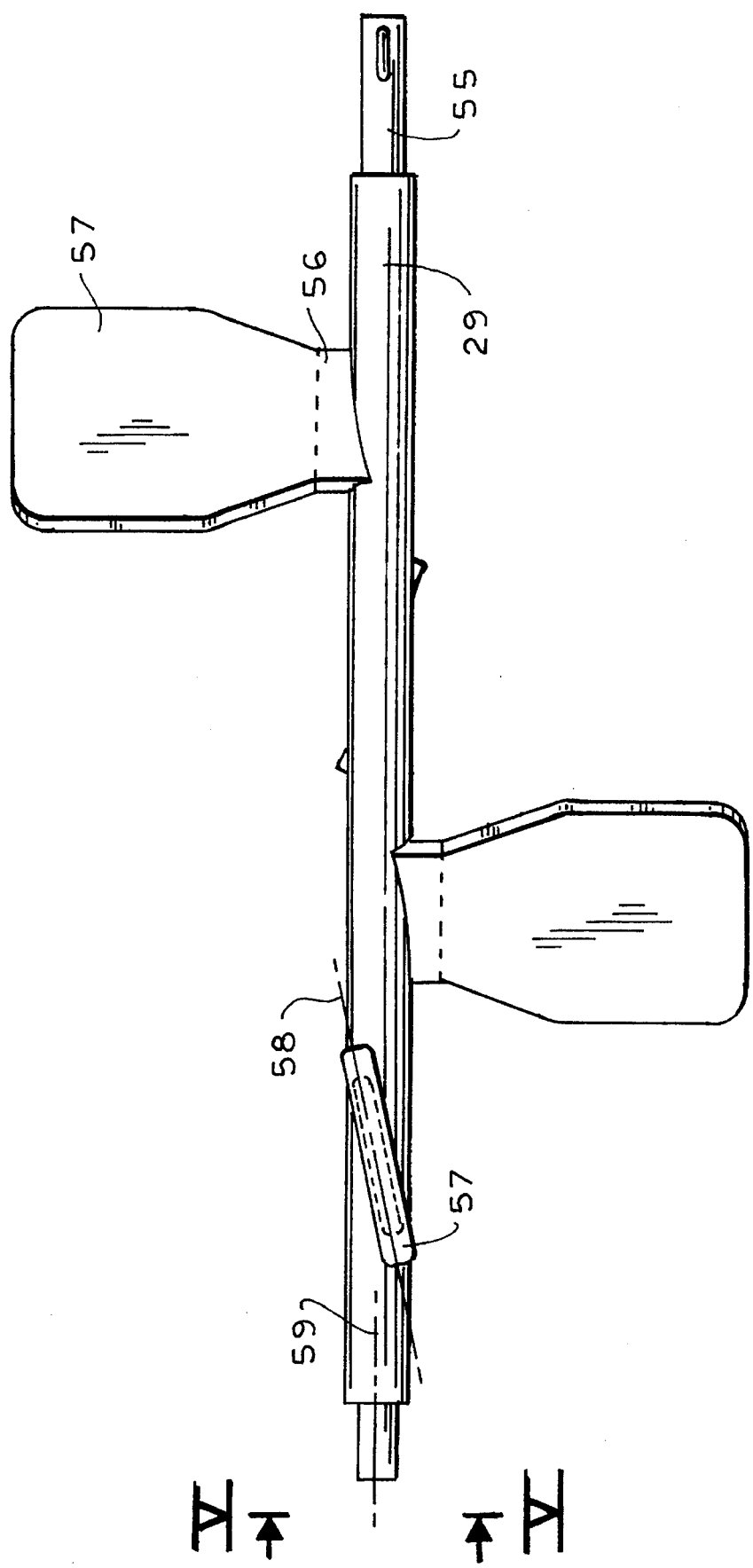
FIG. 4 is a side elevational view of the shaft carrying the arms.
Figure 5:
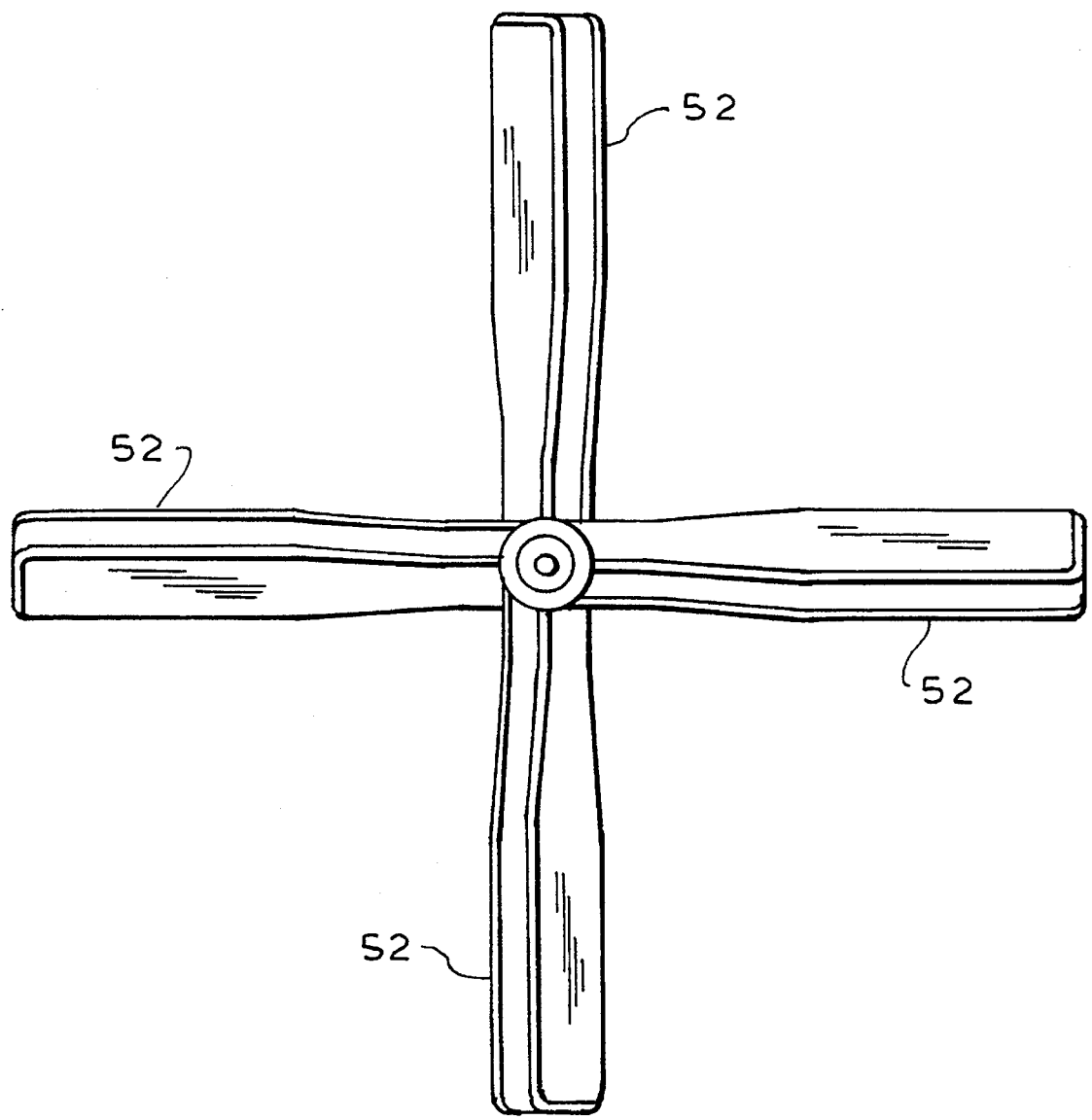
FIG. 5 is an end view taken in the direction of arrow IV of FIG. 4.

As can be seen from FIG. 4, moreover, the paddles 57 lie in planes 58 which are radial planes inclined to the axis 59 of the shaft.

In operation, the vessel is loaded through the chute 30 while the hatch 31 is open. The hatch is closed, the hatch is then chilled and vacuumized, and the phosphate solution is sprayed into the vessel as the paddles massage the meat. After termination of the massaging action as described in the aforementioned patent, the meat is removed manually through the chute 34.

The paddle shaft of FIG. 6 provides a "soft screw" massaging action since, when the shaft 29 is rotated in the sense indicated by the arrow 60, the paddle at the load end leads the paddle behind it which, in turn, leads the next paddle closer toward the discharge end and that, in turn, leads the paddle at the discharge end.

As a result of this orientation of the 4 paddles which are angularly equispaced at 90° about the axis of the shaft 29 and are oriented to urge the meat bodies toward the load end when rotated in the massage rotation since, the axial displacement of the bodies is a minimun and a very gentle massage action is obtained.

Of course, when the sense of rotation of the shaft is altered, i.e. the shaft is rotated in the clockwise, rather than counterclockwise direction 60, the paddles displace the massaged bodies meat toward the discharge end. In this embodiment each of the paddles 57 is provided on a relatively short arm 56.

I claim:

1. A machine for massaging a solution into pieces of meat, comprising:

a pressurizable housing having a generally cylindrical body with an axis inclined to a horizontal and axially opposite ends;

a massaging blade shaft extending along said axis and journaled in respective bearings at said ends;

respective arms axially and angularly spaced about said shaft, secured to said shaft and extending radially therefrom;

a cylindrical receptacle in said housing coaxial with said body and receiving a treatment solution and pieces of meat to be massaged with said solution, said arms being located and oriented so as to retard movement of pieces of meat from an upper end of said receptacle toward a lower end of said receptacle while massaging said solution into said pieces of meat;

an inlet chute at an upper one of said ends of said housing provided with a pressure-sealing hatch and an outlet chute provided with a pressure-sealing hatch at a lower one of said ends of said housing for respectively introducing said pieces of meat to be massaged into said housing and said receptacle and for discharging massaged pieces of meat from said receptacle and said housing;

means forming a refrigerant compartment around said receptacle for chilling said solution and said pieces of meat;

a layer of insulation interposed between said compartment and said housing; and a refrigerating unit for compressing and dissipating compression heat from a refrigerant connected to said compartment in a refrigerant recirculating path.

2. The machine defined in claim 1 wherein said arms are formed with paddles lying in respective radial planes inclined to said axis.

3. The machine defined in claim 2 wherein said paddles are provided with electropolished surfaces engaging said solution and said pieces of meat.

4. The machine defined in claim 3 wherein said receptacle has an electropolished internal surface.

5. The machine defined in claim 2 wherein said arms are arranged along said shaft in a screw pattern tending to displace said pieces of meat away from said discharge chute upon rotation of said shaft for massaging, said shaft having a reversible drive for reversing a direction in which said screw displaces said pieces of meat.

6. The machine defined in claim 1, further comprising means hingedly connecting said hatches to the respective chute for limiting separation of said hatches from said housing for cleaning thereof.

7. The machine defined in claim 1, further comprising a support for said housing and at least one load cell between said housing and said support.

8. The machine defined in claim 7 wherein said support has four legs disposed at corners of a rectangle, said housing having four posts respectively aligned with each of said legs, a respective load cell being interposed between each of said posts and a respective one of said legs.

9. The machine defined in claim 8 wherein said arms are formed with paddles lying in respective radial planes inclined to said axis.

10. The machine defined in claim 9 wherein said paddles are provided with electropolished surfaces engaging said solution and said pieces of meat.

11. The machine defined in claim 10 wherein said receptacle has an electropolished internal surface.

12. The machine defined in claim 11 wherein said arms are arranged along said shaft in a screw pattern tending to displace said pieces of meat away from said discharge chute upon rotation of said shaft for massaging, said shaft having a reversible drive for reversing a direction in which said screw displaces said pieces of meat.

13. The machine defined in claim 12, further comprising means hingedly connecting said hatches to the respective chute for limiting separation of said hatches from said housing for cleaning thereof.

14. The machine defined in claim 1 wherein said arms carrying respective paddles and said paddles are inclined to said axis of said shaft so as to form a screw therewith displacing said pieces of meat from said upper end to said housing to said lower end thereof upon rotation of said shaft in a discharging sense and for massaging said solution into said pieces upon rotation of said shaft opposite said discharging sense in a massaging sense of rotation of said shaft.

15. The machine defined in claim 14 wherein one of said paddles proximal to said upper end leads a second paddle along said shaft angularly in said massaging sense, said second paddle leads a third paddle angularly in said massaging sense and said third paddle angularly leads a fourth paddle along said massaging sense from said upper end toward said lower end in said massaging sense of rotation of said shaft.

\* \* \* \* \*